United States Patent
Naito et al.

(10) Patent No.: US 8,998,351 B2
(45) Date of Patent: Apr. 7, 2015

(54) BRAKE CONTROL DEVICE FOR VEHICLE

(71) Applicant: Advics Co., Ltd., Kariya-shi (JP)

(72) Inventors: Masayuki Naito, Nagakute (JP); Yoichi Abe, Obu (JP); Yasuhiro Koike, Miyoshi (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 68 days.

(21) Appl. No.: 13/754,038

(22) Filed: Jan. 30, 2013

(65) Prior Publication Data

US 2013/0193747 A1 Aug. 1, 2013

(30) Foreign Application Priority Data

Jan. 30, 2012 (JP) .................................. 2012-017090

(51) Int. Cl.
| | |
|---|---|
| *B60T 8/40* | (2006.01) |
| *B60T 13/14* | (2006.01) |
| *B60T 13/68* | (2006.01) |
| *B60T 1/10* | (2006.01) |
| *B60L 7/26* | (2006.01) |
| *B60T 8/48* | (2006.01) |
| *B60T 13/58* | (2006.01) |
| *B60L 7/14* | (2006.01) |

(52) U.S. Cl.
CPC .............. *B60T 13/147* (2013.01); *B60T 13/686* (2013.01); *B60T 1/10* (2013.01); *B60L 7/26* (2013.01); *B60T 8/4872* (2013.01); *B60T 13/586* (2013.01); *B60L 7/14* (2013.01); *B60T 2270/604* (2013.01); *B60L 2250/26* (2013.01)

(58) Field of Classification Search
USPC .............. 303/10, 11, 20, 116.1, 116.2, 116.3, 303/151, 152, 155
See application file for complete search history.

(56) References Cited

U.S. PATENT DOCUMENTS

| 7,597,409 | B2 * | 10/2009 | Kokubo et al. | ............... 303/152 |
| 8,042,886 | B2 * | 10/2011 | Maki et al. | ..................... 303/152 |
| 2007/0228823 | A1 * | 10/2007 | Kokubo et al. | ............... 303/155 |
| 2007/0273204 | A1 * | 11/2007 | Kodama et al. | ............... 303/146 |
| 2009/0096280 | A1 * | 4/2009 | Yamanao et al. | ............... 303/11 |
| 2010/0089709 | A1 | 4/2010 | Shimada et al. | |

FOREIGN PATENT DOCUMENTS

JP 2008-213601 A 9/2008

* cited by examiner

*Primary Examiner* — Robert Siconolfi
*Assistant Examiner* — Nicholas J Lane
(74) *Attorney, Agent, or Firm* — Buchanan Ingersoll & Rooney PC

(57) ABSTRACT

A brake control device for a vehicle includes: a hydraulic brake device including a master cylinder, a wheel cylinder, a differential pressure control valve, and a pump; and a differential pressure control unit that operates the pump and transmits a differential pressure instructing output to the differential pressure control valve to perform a differential pressure control such that a differential pressure is generated; wherein the differential pressure control unit includes a correcting unit, wherein the correcting unit calculates a differential pressure instructing correction amount, based on an increased amount of the differential pressure which is generated by the differential pressure control valve when the increased amount of the differential pressure during the differential pressure control and then corrects the differential pressure instructing output based on the differential pressure instructing correction amount such that the differential pressure instructing output becomes larger than the increased amount of the differential pressure.

8 Claims, 10 Drawing Sheets

BRAKE CONTROL DEVICE FOR VEHICLE

CROSS-REFERENCE TO RELATED APPLICATION

This application claims priority from Japanese Patent Application No. 2012-017090 filed on Jan. 30, 2012, the entire subject matter of which is incorporated herein by reference.

TECHNICAL FIELD

The disclosure relates to a brake control device for a vehicle which generates an master cylinder (hereinafter, referred to as M/C) pressure in an M/C in response to depressing of a brake pedal, and which pressurizes wheel cylinders (hereinafter, referred to as W/Cs) based on the M/C pressure for controlling a brake fluid pressure in a hydraulic brake device.

BACKGROUND

In a well-known brake mechanism, a fluid pressure which is combined a M/C pressure generated by depressing a brake pedal and a fluid pressure generated by a brake fluid pressure increasing unit sucking brake fluid from a M/C and pressurizing the brake fluid is supplied to W/Cs such that the W/C pressure becomes higher than the M/C pressure. In this brake mechanism, if pump pressurization is performed when a driver is depressing the brake pedal, the brake fluid is sucked from the M/C by a pressure pump, so that the W/Cs are pressurized. Therefore, the brake pedal is sucked and then the brake depressing of the driver loosens, so that the M/C pressure is decreased. Meanwhile, if a pump pressurization amount is decreased when the driver is depressing the brake pedal, the decrease of the W/C pressure causes the brake fluid to return from the W/Cs to the M/C. Therefore, the brake pedal returns, and then the depressing of the driver becomes strong. Thereby, it is difficult to increase the W/C pressure to an original target W/C pressure.

For this reason, in the background art, if the brake pedal is sucked, based on an operation amount of the brake pedal before the suction, a braking force is fed back, so that the decrease of the braking force is prevented (see JP-A-2008-213601).

However, since the feedback is performed based on the deceleration of a vehicle, the delay of the feedback such as a delay until a change of the W/C pressure is reflected to the deceleration of the vehicle results in a delay of braking. Further, since the operation amount of the brake pedal before the suction is used as a basis, in a case where the driver performs brake operation during the pressurization by the pressure pump, it is difficult to exactly reflect the brake operation. In other words, in a case where the pressurization by the pressure pump and the brake operation of the driver overlap, it becomes difficult to exactly reflect the brake operation.

SUMMARY

In view of the above, this disclosure provides a brake control device for a vehicle including a brake mechanism sucking brake fluid from an M/C by a pressure pump and pressurizing W/Cs which overcomes the above drawback.

According to this disclosure, a brake control device for a vehicle includes a master cylinder which generates a brake fluid pressure according to a brake operation amount of a brake operating member by a driver, wheel cylinders which are connected to the master cylinder by a main pipe line and which generates a braking force according to the generated fluid pressure therein, a differential pressure control valve which is disposed in the main pipe line and which generates a differential pressure corresponding to a fluid pressure difference between the master cylinder and the wheel cylinders, and a pump which sucks the brake fluid from a portion of the main pipe line between the differential pressure control valve and the master cylinder and which discharges the brake fluid to a portion of the main pipe line between the differential pressure control valve and the wheel cylinder for increasing the brake fluid pressure of the wheel cylinders; and a differential pressure control unit which operates the pump and which transmits a differential pressure instructing output to the differential pressure control valve to perform a differential pressure control such that a differential pressure corresponding to the differential pressure instructing output is generated. The differential pressure control unit includes a correcting unit which calculates a differential pressure instructing correction amount corresponding to a correction amount of the differential pressure instructing output based on an increased amount of the differential pressure when the differential pressure generated by the differential pressure control valve is increased amount of the differential pressure during the differential pressure control and which corrects the differential pressure instructing output based on the differential pressure instructing correction amount such that the differential pressure instructing output becomes larger than the increased amount of the differential pressure.

According to the above brake control device, the differential pressure instructing correction amount is calculated based on the increased amount of the differential pressure, and the differential pressure instructing output is corrected based on the differential pressure instructing correction amount such that the differential pressure instructing output becomes larger than the increased amount of the differential pressure. Thereby, even if pump pressurization is performed during the brake operation of the driver, it is possible to set the differential pressure instructing output for the differential pressure control valve so that the differential pressure instructing output reflects a decreased amount of the M/C pressure based on suction of the brake fluid from the M/C by the pump. Therefore, even in a case where the pump pressurization and the brake operation of the driver overlap, it is possible to reflect the brake operation.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
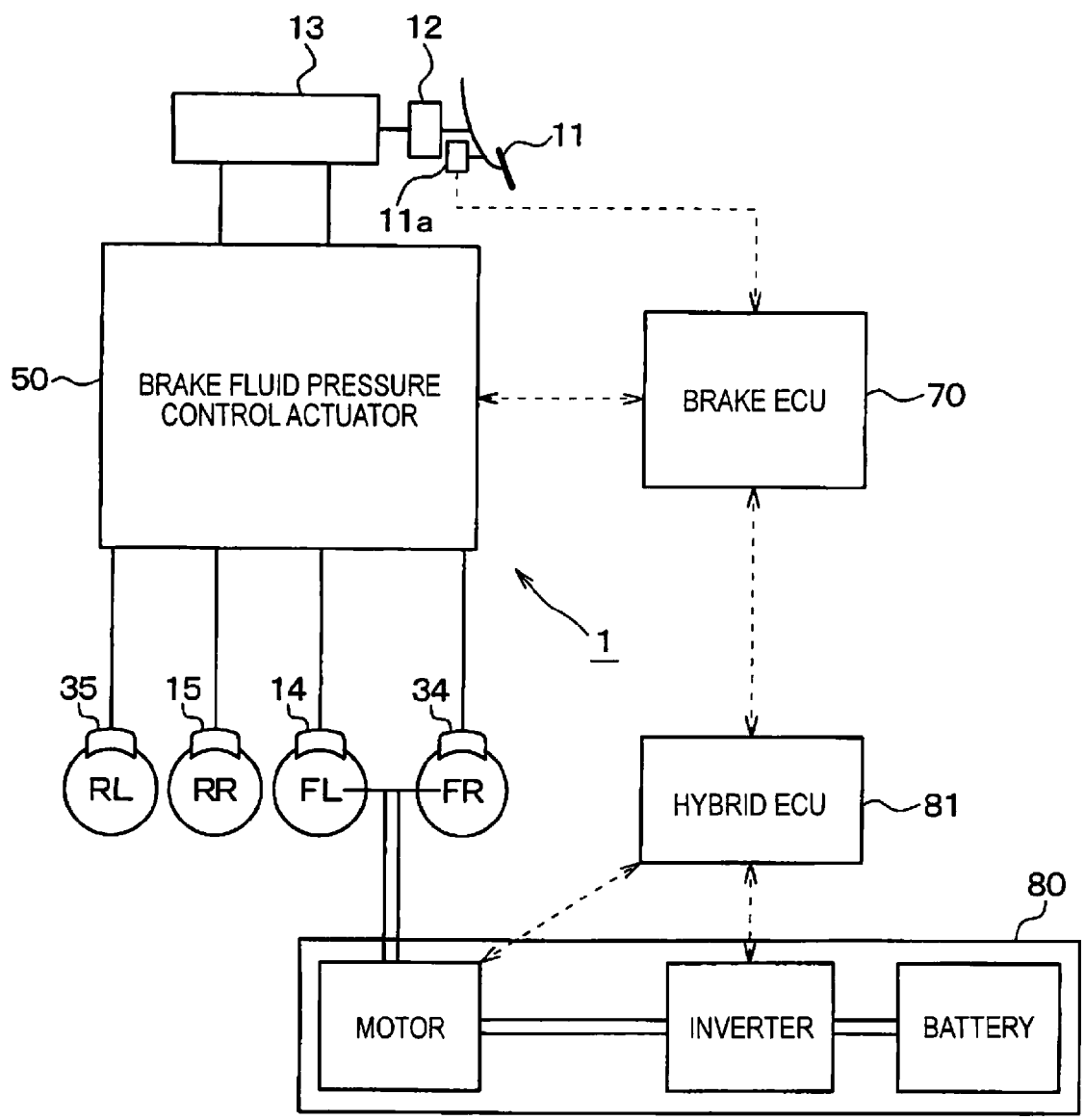
FIG. 1 is a view illustrating a block configuration of each function of a hybrid vehicle including a brake control device for a vehicle according to a first illustrative embodiment of this disclosure.

Hereinafter, illustrative embodiments of this disclosure will be described with reference to the accompanying drawings. Throughout the following embodiments, parts which are identical or equal to each other are denoted by the same reference symbols in the drawings.

First Illustrative Embodiment

A first illustrative embodiment of this disclosure will be described. FIG. 1 is a view illustrating a bock configuration of each function of a hybrid vehicle including a brake control device 1 for a vehicle according to a first illustrative embodiment of this disclosure.

Figure 2:
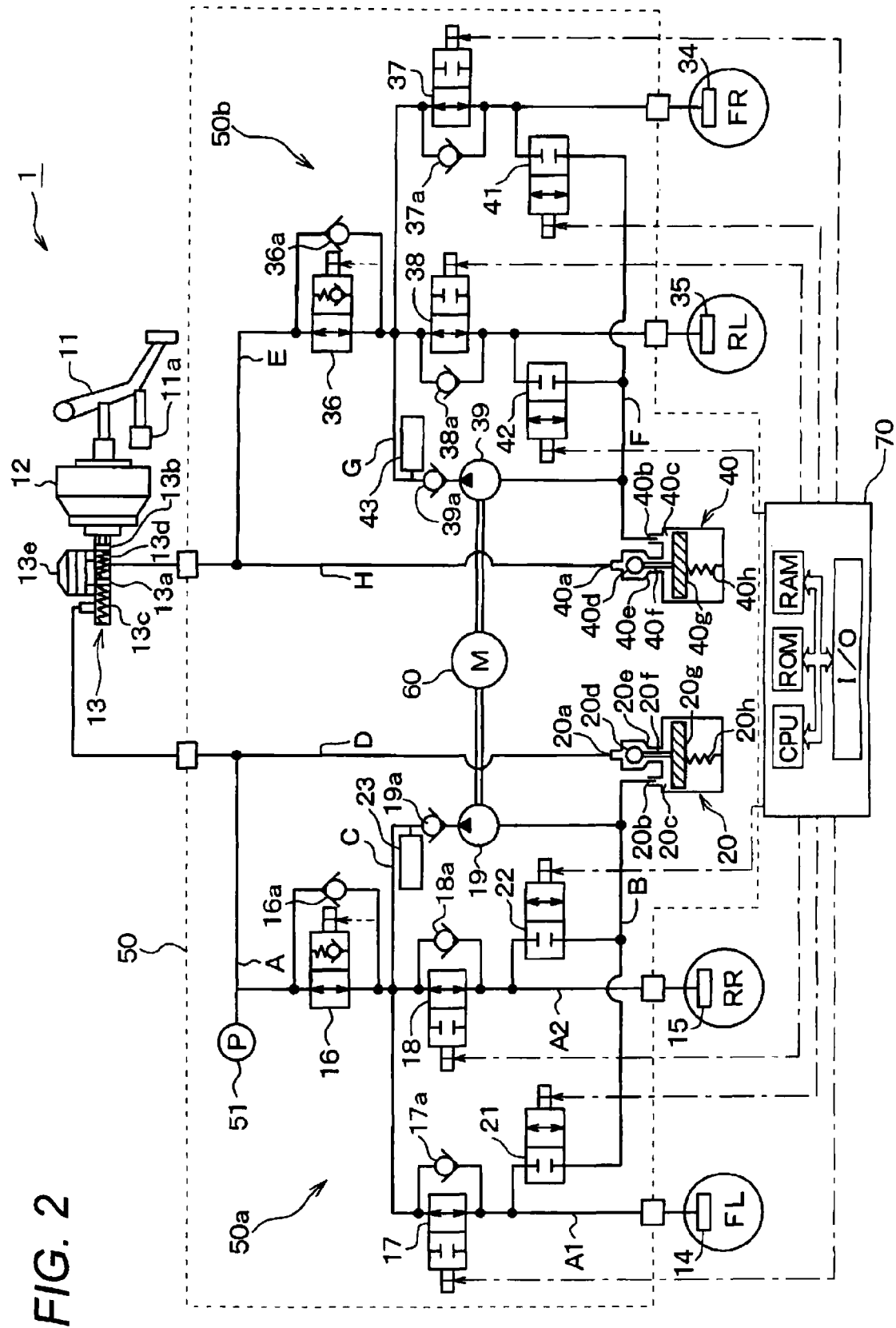
FIG. 2 is a view illustrating the detailed structure of each unit constituting a hydraulic brake device.

First, a hydraulic brake device of the brake control device 1 for a vehicle according to the present illustrative embodiment will be described. As shown in FIG. 1, the brake control device 1 for a vehicle includes a brake pedal 11, a servo unit 12, an M/C 13, W/Cs 14, 15, 34, and 35, and an brake fluid pressure control actuator 50, which configure the hydraulic brake device. Also, the brake control device 1 for a vehicle includes a brake ECU 70. The brake ECU 70 performs control on the hydraulic brake device during normal brake, when performing regenerative cooperative control with a regenerative braking device to be described below, and so on, thereby controlling a hydraulic braking force to be generated by the hydraulic brake device. Therefore, during the regenerative cooperative control, according to a regenerative braking force generated by the regenerative braking device in addition to the hydraulic braking force generated by the hydraulic brake device, a desired braking force is generated. FIG. 2 is a view illustrating the detailed structure of each unit constituting the hydraulic brake device.

As shown in FIG. 2, the brake pedal 11 serving as a brake operating member which is depressed by a driver is connected to a stroke sensor 11a. A detection signal of the stroke sensor 11a is transmitted to the brake ECU 70 such that an amount of depressing of the brake pedal 11 can be detected. Also, the brake pedal 11 is connected to the M/C 13 and the servo unit 12 serving as a brake fluid pressure generating source when the driver depresses the brake pedal 11, a depressing force is boosted by the servo unit 12, and then presses master pistons 13a and 13b provided to the M/C 13. Thereby, the same M/C pressure is generated in a primary chamber 13c and a secondary chamber 13d partitioned by the master pistons 13a and 13b, respectively.

The M/C 13 includes a master reservoir 13e having paths which are communicated to the primary chamber 13c and the secondary chamber 13d, respectively. The master reservoir 13e supplies brake fluid into the M/C 13 through the paths or stores redundant brake fluid in the M/C 13. The M/C pressure which is generated in the M/C 13 is transmitted to each of the W/Cs 14, 15, 34, and 35 through the brake fluid pressure control actuator 50.

The brake fluid pressure control actuator 50 is configured to include a first piping system 50a and a second piping system 50b. The first piping system 50a controls a brake fluid pressure to be applied to a front left wheel FL and a rear right wheel RR, and the second piping system 50b controls a brake fluid pressure to be applied to a rear left wheel RL and a front right wheel FR. Two piping systems of the first and second piping systems 50a and 50b configure X-piping.

Hereinafter, the first and second piping systems 50a and 50b will be described. Since the first piping system 50a and the second piping system 50b have the similar configuration, the first piping system 50a will be described here. With respect to the second piping system 50b, refer to the first piping system 50a will be referred to.

The first piping system 50a includes a pipe line A serving as a main pipe line for transmitting the above-mentioned M/C pressure to the W/C 14 provided to the front left wheel FL and the W/C 15 provided to the rear right wheel RR. Through the pipe line A, W/C pressures are generated in the W/Cs 14 and 15, respectively.

Also, on the pipe line A, a first differential pressure control valve 16 having a pressure regulating valve which can be controlled between a connection state and a differential pressure state is provided. The first differential pressure control valve 16 becomes the connection state in a normal brake state, and becomes the differential pressure state if a current flows into a solenoid. A differential pressure formed by the first differential pressure control valve 16 varies according to the current value of the current flowing in the solenoid, and increases as the current value increases. If the first differential pressure control valve 16 is in the differential pressure state, the flow of the brake fluid is regulated such that the W/C pressures become higher than the M/C pressure by the differential pressure.

Also, the pipe line A branches into two pipe lines A1 and A2 at the downstream of the W/Cs 14 and 15. On one of the two pipe lines A1 and A2, a first pressure increment control valve 17 for controlling an increased amount of the brake fluid pressure to the W/C 14 is provided, and on the other, a second pressure increment control valve 18 for controlling an increased amount of the brake fluid pressure to the W/C 15 is provided.

The first and second pressure increment control valves 17 and 18 are configured by electromagnetic valves serving as two-position valves which can be controlled between connection and shutoff states. If the first and second pressure increment control valves 17 and 18 are controlled such that they become the connection state, the M/C pressure or a brake fluid pressure attributable to ejection of the brake fluid from a pump 19 (to be described below) is applied to the W/Cs 14 and 15.

Also, during normal braking according to operation of the driver on the brake pedal 11, the first differential pressure control valve 16 and the first and second pressure increment control valves 17 and 18 are always controlled such that they become the connection state. Further, in parallel to the first differential pressure control valve 16 and the first and second pressure increment control valves 17 and 18, safety valves 16a, 17a, and 18a are provided, respectively.

On a pipe line B serving as a depressurizing pipe line which connects an intermediate part between the first pressure increment control valve 17 on the pipe line A and the W/C 14 and an intermediate part between the second pressure increment control valve 18 on the pipe line A and the W/C 15 to a pressure regulating reservoir 20, a first pressure decrement control valve 21 and a second pressure decrement control valve 22 configured by electromagnetic valves serving as two-position valves which can be controlled between connection and shutoff states are provided. During normal braking, the first and second pressure decrement control valves 21 and 22 always become the shutoff state.

A pipe line C serving as a reflux pipe line is provided to connect the pressure regulating reservoir 20 and the pipe line A which is the main pipe line. On the pipe line C, the self-suction pump 19 which is driven by a motor 60 to suck the brake fluid from the pressure regulating reservoir 20 and eject the brake fluid toward the M/C 13 or the W/Cs 14 and 15 is provided. On the ejection port side of the pump 19, a safety valve 19a is provided to prevent high-pressure brake fluid from being applied to the pump 19, and a fixed-capacity damper 23 is provided to mitigate pulsation of the brake fluid ejected by the pump 19.

Also, in order to connect the pressure regulating reservoir 20 and the M/C 13, a pipe line D serving as an auxiliary pipe line is provided. Through the pipe line D, the pump 19 sucks the brake fluid from the M/C 13 and ejects the brake fluid to the pipe line A, so that it is possible to supply the brake fluid toward the W/Cs 14 and 15 during TCS control, ABS control, or the like, thereby increasing the W/C pressures of the target wheels.

The pressure regulating reservoir 20 includes a reservoir hole 20a which is connected to the pipe line D and receives the brake fluid from the M/C 13, and a reservoir hole 20b which is connected to the pipe line B and the pipe line C, receives the brake fluid released from the W/Cs 14 and 15, and supplies the brake fluid to the suction side of the pump 19. The reservoir holes 20a and 20b are connected to a reservoir chamber 20c. On the inner side from the reservoir hole 20a, a ball valve 20d is provided. In the ball valve 20d, a rod 20f having a predetermined stroke for vertically moving the ball valve 20d is provided independently from the ball valve 20d. Also, inside the reservoir chamber 20c, a piston 20g which operates in association with the rod 20f, and a spring 20h which generates a force to press the piston 20g toward the ball valve 20d, thereby ejecting the brake fluid in the reservoir chamber 20c are provided.

In the pressure regulating reservoir 20 configured as described the above, if a predetermined amount of brake fluid is stored, the ball valve 20d is settled on a valve seat 20e such that the brake fluid does not flow into the pressure regulating reservoir 20. Therefore, an amount of brake fluid larger than the suction capacity of the pump 19 cannot flow in the reservoir chamber 20c, and thus a high pressure cannot be applied to the suction side of the pump 19.

Also, the brake fluid pressure control actuator 50 includes an M/C pressure sensor 51. The M/C pressure sensor 51 is provided at a part of the brake piping having the same pressure as the M/C pressure. In a case of the present embodiment, the M/C pressure sensor 51 is provided between the first differential pressure control valve 16 and the M/C 13 on the pipe line A. A detection signal of the M/C pressure sensor 51 is transmitted to the brake ECU 70.

Meanwhile, as described above, the second piping system 50b has the substantially same configuration as that of the first piping system 50a. In other words, the first differential pressure control valve 16 and the safety valve 16a correspond to a second differential pressure control valve 36 and a safety valve 36a. The first and second pressure increment control valves 17 and 18 and the safety valves 17a and 18a correspond to third and fourth pressure increment control valves 37 and 38 and safety valves 37a and 18a, respectively. And the first and second pressure decrement control valves 21 and 22 correspond to third and fourth pressure decrement control valves 41 and 42. The pressure regulating reservoir 20 and the components 20a to 20h correspond to a pressure regulating reservoir 40 and components 40a to 40h. The pump 19 and the safety valve 19a correspond to a pump 39 and a safety valve 39a. The damper 23 corresponds to a damper 43. Also, the pipe line A, the pipe line B, the pipe line C, and the pipe line D correspond to a pipe line E, a pipe line F, a pipe line G, and a pipe line H. In this way, the fluid pressure piping structure of the brake control device 1 for a vehicle is configured.

The brake ECU 70 is configured by a known micro calculator having a CPU, a ROM, a RAM, an I/O, and so on, and performs various processes such as calculation according to programs stored in the ROM and the like. For example, the brake ECU 70 obtains the stroke amount of the brake pedal 11 (hereinafter, referred to as a pedal stroke) or the M/C pressure as a brake operation amount from a detection signal of the stroke sensor 11a and a detection signal of the M/C pressure sensor 51, calculates a control brake force corresponding to the brake operation amount based on the pedal stroke or the M/C pressure, or outputs an electric signal to the brake fluid pressure control actuator 50 for performing pump pressurization. Based on the electric signal from the brake ECU 70, control on voltage application to a voltage to the motor 60 for driving the individual control valves 16 to 18, 21, 22, 36 to 38, 41, and 42, and the pumps 19 and 39 is performed. In this way, control on the W/C pressure to be generated by each of the W/Cs 14, 15, 34, and 35 is performed.

Specifically, in the brake fluid pressure control actuator 50, if a current is supplied from the brake ECU 70 to the motor 60 and the solenoids for driving the control values, according to the current supply, the individual control valves 16 to 18, 21, 22, 36 to 38, 41, and 42 are driven such that a brake piping course is set. Then, the brake fluid pressure according to the set brake piping course is generated in the W/Cs 14, 15, 34, and 35, and a braking force to be generated at each wheel is controlled.

For example, if pressurization is performed such that the W/C pressures in the W/Cs 14 and 34 of the front wheels FL and FR become the M/C pressure and a hydraulic braking force is generated, the first differential pressure control valve 16 and the second differential pressure control valve 36 are switched to the differential pressure state, and in that state, the motor 60 is driven such that the pumps 19 and 39 performs suction and ejection of the brake fluid. Therefore, the brake fluid in the M/C 13 is sucked to the pump 39 through the pipe lines H and G and then is supplied to the W/C 34 of the front wheel FR through the pipe lines G and E. Similarly, the brake fluid in the M/C 13 is sucked to the pump 19 through the pipe lines D and C, and then is supplied to the W/C 14 of the front wheel FL through the pipe lines C and A. In this case, since a differential pressure is generated between the M/C 13 and the W/Cs 14 and 34 by the pressure regulating valves in the first differential pressure control valve 16 and the second differential pressure control valve 36, the W/Cs 14 and 34 are subjected to pump pressurization such that the W/C pressure becomes higher than the M/C pressure, and the hydraulic braking force is generated.

Also, as shown in FIG. 1, the hybrid vehicle includes a regenerative braking device 80, and a hybrid ECU 81 for controlling the regenerative braking device 80 such that regenerative braking control is performed.

The regenerative braking device 80 is configured to include a motor that is connected to an axle connecting both front wheels FL and FR, an inverter that is electrically connected to the motor, a battery that is electrically connected to the inverter, and so on. The motor is configured, for example, by an AC synchronous type, and the inverter converts a direct current generated by the battery into an alternating current, so that power supply to the motor is performed. The inverter acts to convert the direct current of the batter into an alternating current based on a control signal of the hybrid ECU 81, and to convert an alternating current generated by the motor into a direct current, thereby charging the battery.

The hybrid ECU 81 mainly controls a drive system. The hybrid ECU 81 supplies data for regenerative braking control to the brake ECU 70, and receives necessary data from the brake ECU 70.

Also, the hybrid ECU 81 performs the regenerative braking control or the like in cooperation with the brake ECU 70, and controls the inverter, thereby controlling the operation of the motor. In other words, based on the control signal of the hybrid ECU 81, the inverter controls the operation of the motor, so that the motor is driven by the torque of both front wheels FL and FR (or the axle connecting them) such that power generation is performed, and the battery is charged by the obtained power. During this power generation, a braking force is generated according to the resistance of the motor and is used as a regenerative braking force.

In this case, the hybrid ECU 81 deals with various information of the regenerative braking device 80 and transmits necessary information to the brake ECU 70 in response to a request from the brake ECU 70 or the like. For example, the hybrid ECU 81 calculates an actually requirable regenerative braking force (regenerative torque), generates a regenerative braking force based on the calculated requirable regenerative braking force, obtains the actually generated regenerative braking force (regeneration performance braking force), and thus transmits the obtained braking force to the brake ECU 70. Therefore, in the hydraulic brake device, based on the regenerative braking force generated in the regenerative braking device 80, regenerative cooperative control is performed, such that a braking force according to brake operation of the driver or a brake fluid required based on vehicle control is generated.

Figure 3A:
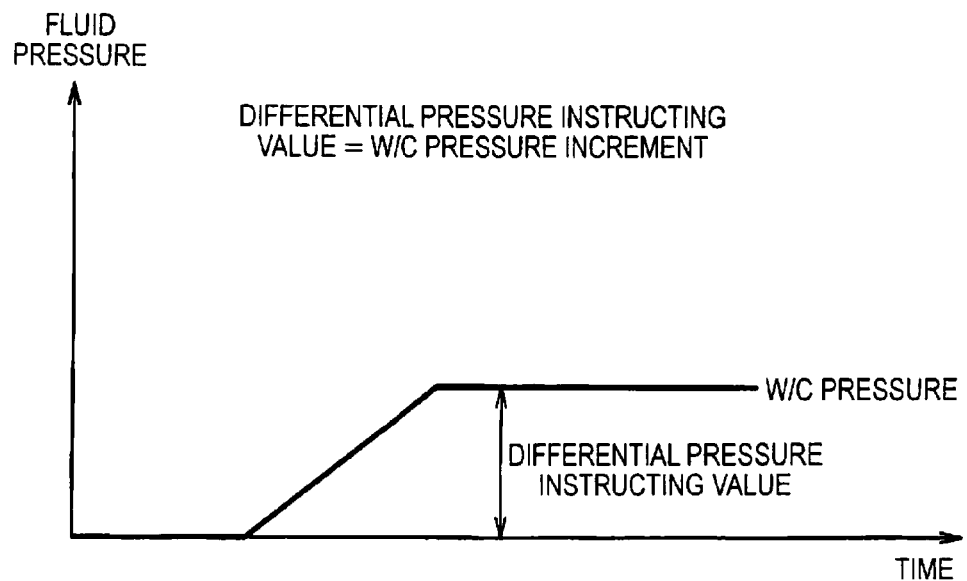
FIGS. 3A and 3B are characteristic diagrams illustrating the relation among existence or non-existence of depressing of a brake pedal 11, a W/C pressure, and differential pressure instructing values to first and second differential pressure control valves.
Figure 3B:
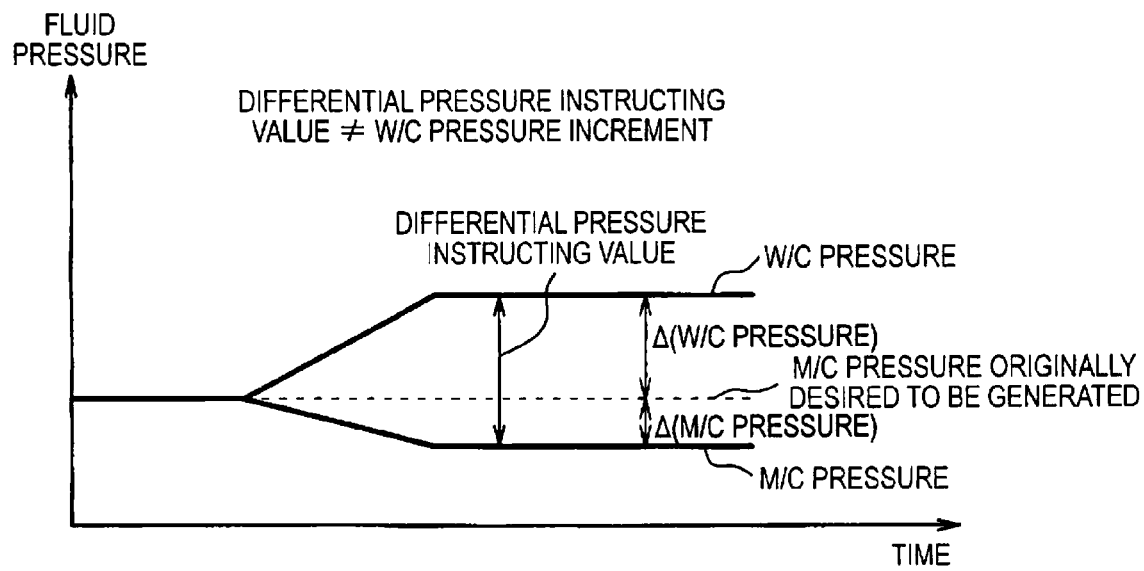

Hereinafter, the operation of the brake control device 1 for a vehicle configured as described above will be described. Prior to a description of the detailed operation of the brake control device 1 for a vehicle, first, the reason of the operation will be described. FIGS. 3A and 3B show characteristic diagrams illustrating the relation among existence or non-existence of depressing of the brake pedal 11, the W/C pressure, and the differential pressure instructing values to the first and second differential pressure control valves 16 and 36, and a description will be made with reference to FIGS. 3A and 3B.

In a case of pressurizing the W/Cs 14, 15, 34, and 35 by pump pressurization, the pumps 19 and 39 are driven and the first and second differential pressure control valves 16 and 36 are switched to the differential pressure state, and then the differential pressure between the M/C pressure and the W/C pressure is controlled by the first and second differential pressure control valves 16 and 36, so that a pressurization amount is regulated. The differential pressure generated by the first and second differential pressure control valves 16 and 36 is determined according to the current value of the current supplied to the solenoids of the first and second differential pressure control valves 16 and 36, and thus the brake ECU 70 supplies an instructing current having a current value corresponding to the generated differential pressure as a differential pressure instructing value to the solenoids of the first and second differential pressure control valves 16 and 36.

Here, in a case where the brake pedal 11 is not being depressed, the M/C pressure is 0. Therefore, as shown in FIG. 3A, the W/C pressure which is generated in a case of supplying an instructing current corresponding to the differential pressure instructing value to the solenoids becomes the same value as a required amount in the W/C pressure (hereinafter, referred to as a W/C pressure increment). Therefore, the differential pressure instructing value and the W/C pressure increment coincide with each other.

In contrast, in a case where the brake pedal 11 is being depressed, an M/C pressure is generated. If pump pressurization is performed in that state, the M/C pressure is reduced due to suction of the brake fluid by the pumps 19 and 39. Therefore, as shown in FIG. 3B, the W/C pressure which is generated in a case of supplying the instructing current corresponding to the differential pressure instructing value to the solenoids becomes the sum of a value obtained by subtracting an M/C decreased amount of pressure (=Δ(M/C pressure)) according to the suction from the M/C pressure (a broken line portion in FIG. 3B) originally generated by the driver, and a differential pressure corresponding to the differential pressure instructing value. Therefore, the target increase amount of the W/C pressure (=Δ(W/C pressure)) based on the M/C pressure which the driver has originally generated by brake operation becomes the W/C pressure increment, and thus the W/C pressure increment becomes smaller than the differential pressure instructing value.

Therefore, in a case where the brake pedal 11 is being depressed, it is necessary to set the differential pressure instructing value to the first and second differential pressure control valves 16 and 36 in view of a reduction in the M/C pressure attributable to the suction of the brake fluid by the pumps 19 and 39. By doing so, it is possible to generate a W/C pressure which is the sum of the originally generated M/C pressure corresponding to the intended brake operation of the driver and the W/C pressure increment even if pump pressurization is performed during brake operation of the driver. Also, even if the brake pedal 11 is depressed during pump pressurization, it is possible to set the differential pressure instructing value to the first and second differential pressure control valves 16 and 36 in view of a decreased amount of the M/C pressure based on the suction of the brake fluid from the M/C 13 by the pumps 19 and 39. Therefore, even in a case where pump pressurization and brake operation of the driver overlap, it is possible to reflect the brake operation.

Figure 4:
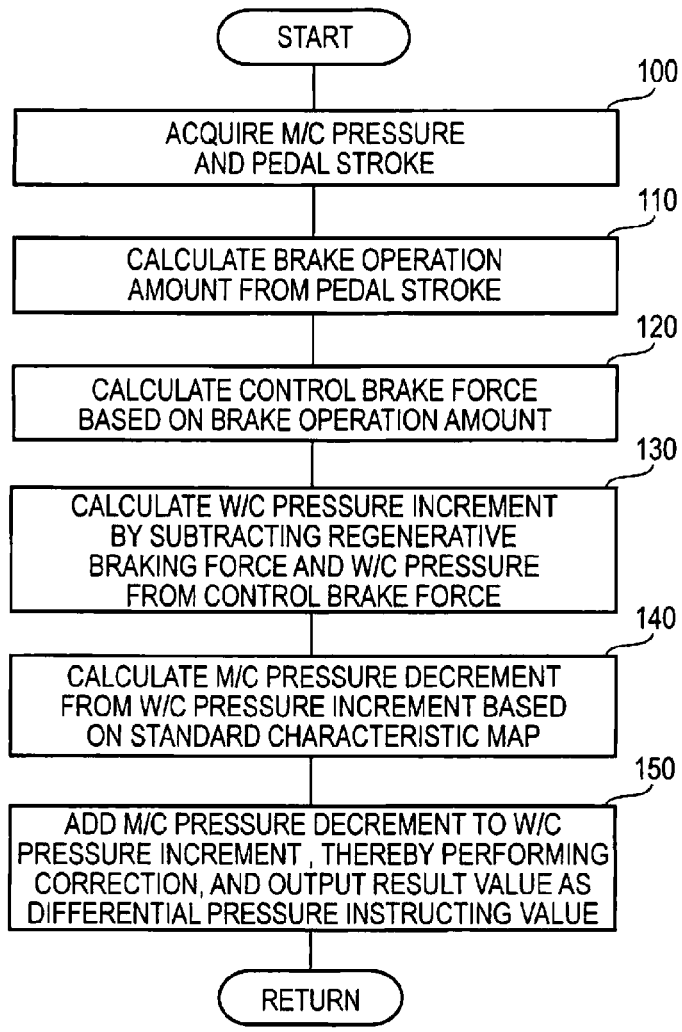
FIG. 4 is a flow chart illustrating a brake control process which a brake ECU performs.

In order to implement this, the brake control device 1 for a vehicle according to the present illustrative embodiment performs the following operation. FIG. 4 is a flow chart illustrating a brake control process which is performed by the brake ECU 70 of the brake control device 1 for a vehicle according to the present embodiment. Each process shown in FIG. 4 is performed for each predetermined control period, for example, when an ignition switch is on.

First, in step 100, the M/C pressure and the pedal stroke is acquired. The M/C pressure is acquired by inputting a detection signal of the M/C pressure sensor 51, and the pedal stroke is acquired by inputting a detection signal of the stroke sensor 11a. Then, in step 110, a brake operation amount is calculated from the pedal stroke calculated in step 100. Since the pedal stroke is a value corresponding to the brake operation amount, the pedal stroke can be directly used as the brake operation amount. Alternatively, the brake operation amount may be obtained, for example, by subtracting the play of the pedal from the pedal stroke.

Figure 5:
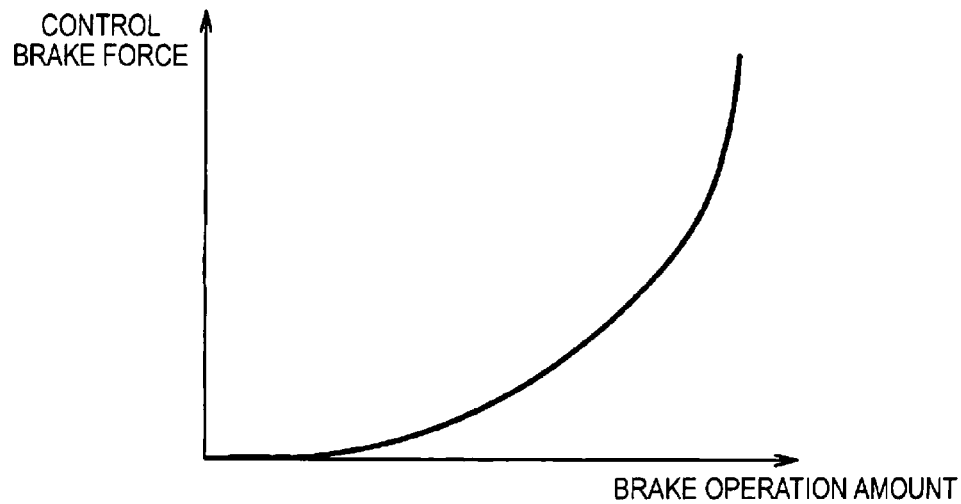
FIG. 5 is a map illustrating the relation between a brake operation amount and a control brake force.

Next, the process proceeds to step 120 in which it calculates the control brake force based on the brake operation amount. The control brake force is calculated by selecting a control brake force corresponding to the brake operation amount, for example, based on a map representing the relation between the brake operation amount and the control brake force shown in FIG. 5. Similarly, it is possible to calculate the control brake force corresponding to the brake operation amount using a relational expression representing the relation between the brake operation amount and the control brake force, not by the map. This relation between the brake operation amount and the control brake force is obtained in advance by experiments or the like.

Subsequently, the process proceeds to step 130 in which it subtracts the regenerative braking force and the M/C pressure from the control brake force calculated in step 120, thereby calculating the W/C pressure increment. The control brake force is generated by the hydraulic braking force and the regenerative braking force. Therefore, the hydraulic braking force is obtained by subtracting the regenerative braking force from the control brake force. Since the hydraulic braking force is a value corresponding to the W/C pressure and obtained by adding the M/C pressure and the W/C pressure increment, the W/C pressure increment is calculated by subtracting the M/C pressure from the hydraulic braking force. Also, all of the control brake force, the regenerative braking force, and the hydraulic braking force being described here are treated as values obtained by conversion to the same parameter (for example, fluid pressure conversion, torque conversion, or the like). Further, the regenerative braking force is grasped by acquiring data relative to the regenerative braking force generated by the hybrid ECU 81.

Figure 6:
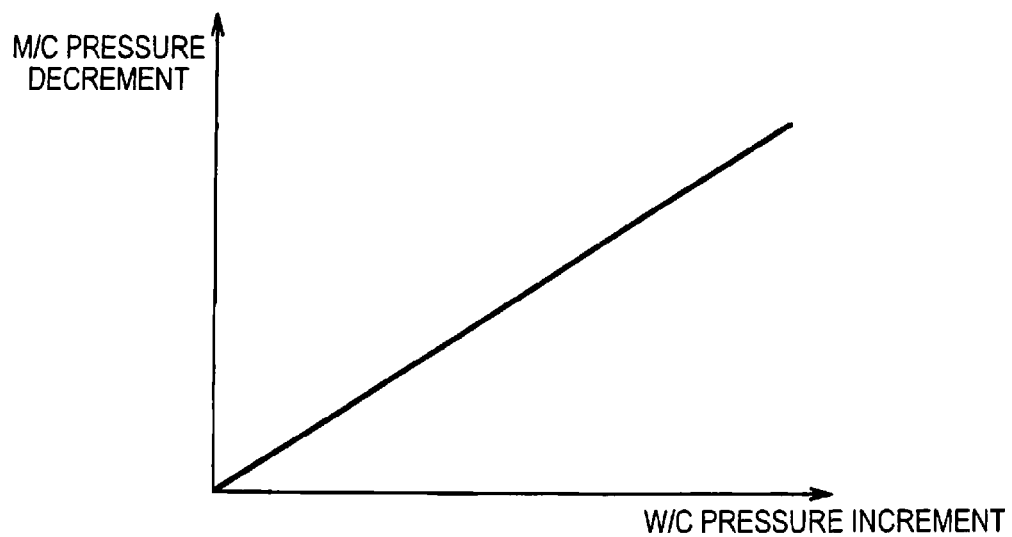
FIG. 6 is a map illustrating the relation between an increased amount of the W/C pressure and a decreased amount of a M/C pressure.

Next, in step 140, the M/C pressure decrement is calculated based on the W/C pressure increment. In a case where pump pressurization is not being performed, brake operation of the driver is implemented as a change in the M/C pressure. Assuming that this relation is substantially established even during pump pressurization, the M/C pressure decrement is determined according to the W/C pressure increment attributable to the pump pressurization. For this reason, a standard characteristic map representing the relation between the W/C pressure increment and the M/C pressure decrement is generated in advance, and an M/C pressure decrement corresponding to the W/C pressure increment calculated in step 130 is selected based on the standard characteristic map, so that it is possible to calculate the M/C pressure decrement. For example, the standard characteristic map representing the relation between the W/C pressure increment and the M/C pressure decrement can be represented as a relation in which the W/C pressure increment and the M/C pressure decrement are proportional to each other, as shown in FIG. 6.

As described above, if calculating the M/C pressure decrement in that way, the process proceeds to step 150 in which it adds the M/C pressure decrement to the W/C pressure increment and outputs the result value as the differential pressure instructing value. In other words, the W/C pressure increment calculated in step 130 is not directly used as the differential pressure instructing value, but the differential pressure instructing value is obtained by correction using the M/C pressure decrement as a correction amount. Therefore, even if pump pressurization is performed during brake operation of the driver, it is possible to generate a W/C pressure corresponding to the sum of the originally generated M/C pressure corresponding to the intended brake operation of the driver, and thus the W/C pressure increment.

As described above, in the brake control device 1 for a vehicle according to the present embodiment, when the differential pressure of the first and second differential pressure control valves 16 and 36 increases, the correction amount is calculated on the differential pressure increase, and the differential pressure instructing value is corrected based on the correction amount such that the differential pressure instructing value becomes larger than the differential pressure increment. Specifically, in the case of the present embodiment, the M/C pressure decrement is calculated from the W/C pressure increment corresponding to the differential pressure increment, and the M/C pressure decrement is added as the correction amount to the W/C pressure increment, so that the differential pressure instructing value to the first and second differential pressure control valves 16 and 36 is obtained. Therefore, even if pump pressurization is performed during brake operation of the driver, it is possible to generate a W/C pressure which is the sum of the originally generated M/C pressure corresponding to the intended brake operation of the driver and the W/C pressure increment. Also, even if the brake pedal 11 is depressed during pump pressurization, it is possible to set the differential pressure instructing value to the first and second differential pressure control valves 16 and 36 in view of a decreased amount of the M/C pressure based on the suction of the brake fluid from the M/C 13 by the pumps 19 and 39. In other words, since depressing of the brake is implemented as a change (increase) in the M/C pressure which becomes the standard of pressurization, increasing of the W/C pressure is performed according to the differential pressure instructing value obtained by reflecting a decreased amount of the M/C pressure based on suction of the pumps to the changed M/C pressure. Therefore, even in a case where pump pressurization and brake operation of the driver overlap, it is possible to reflect the brake operation to the W/C pressure.

Second Illustrative Embodiment

A second illustrative embodiment of this disclosure will be described. The present illustrative embodiment is the same as the first illustrative embodiment except for the method of setting the correction amount of the differential pressure instructing value, and thus only differences from the first illustrative embodiment will be described.

In the first embodiment, a case of representing the relation of the M/C pressure decrement to the W/C pressure increment amount of one standard map has been described. However, according to the magnitude of the M/C pressure, there is a possibility that an error between the M/C pressure decrement calculated by using the standard map and an actual M/C pressure decrement may increase. For this reason, in a case where an error in the M/C pressure decrement increases according to the magnitude of the M/C pressure, such as a case where control on a portion where the W/C pressure increment is to be increased, for example, switching from the regenerative braking force to the hydraulic braking force is performed, a plurality of maps is used to calculate the M/C pressure decrement.

Figure 7:
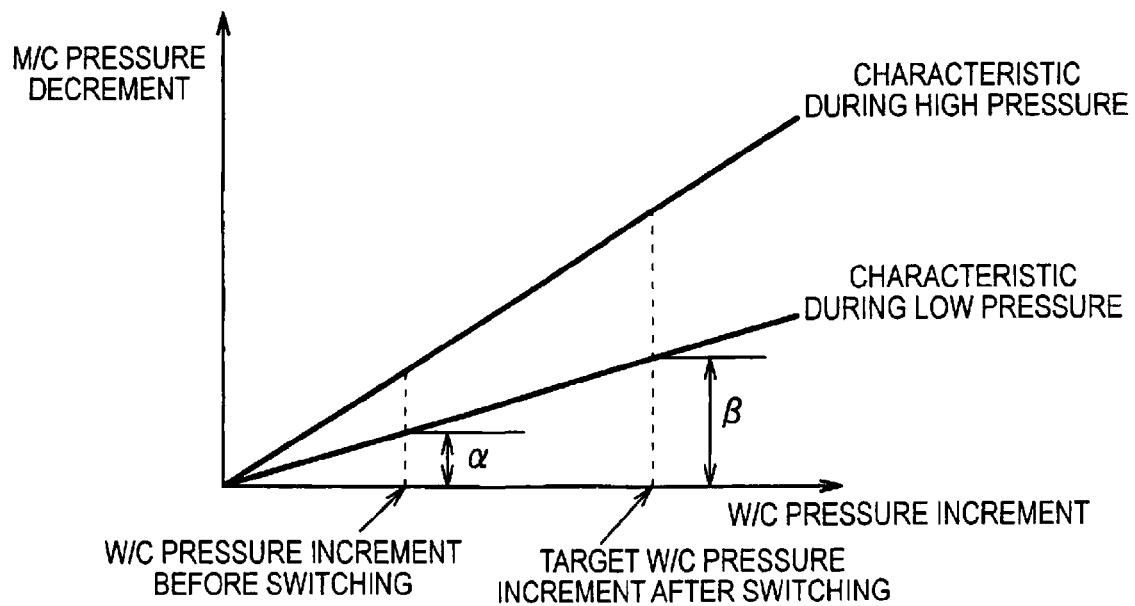
FIG. 7 is a map illustrating the relation between the decreased amount of the M/C pressure and the increased amount of the W/C pressure according to the level of the M/C pressure.

FIG. 7 shows maps representing the relation between the W/C pressure increment and the M/C pressure decrement according to the level of the M/C pressure. FIG. 7 shows two maps, that is, a characteristic map during high pressure when the M/C pressure is high, and a characteristic map during low pressure when the M/C pressure is low. For example, if the magnitude of the M/C pressure is equal to or greater than a predetermined threshold value, the characteristic map during high pressure can be used, and if the magnitude of the M/C pressure is less than the predetermined threshold value, the characteristic map during low pressure can be used.

Also, in a case of performing switching from the regenerative braking force to the hydraulic braking force, since the W/C pressure increment before the switching is small, the M/C pressure decrement at that time is small. For this reason, in the present embodiment, only in correction during switching from the regenerative braking force to the hydraulic braking force in the regenerative cooperative control, the M/C pressure decrement is obtained.

Figure 8:
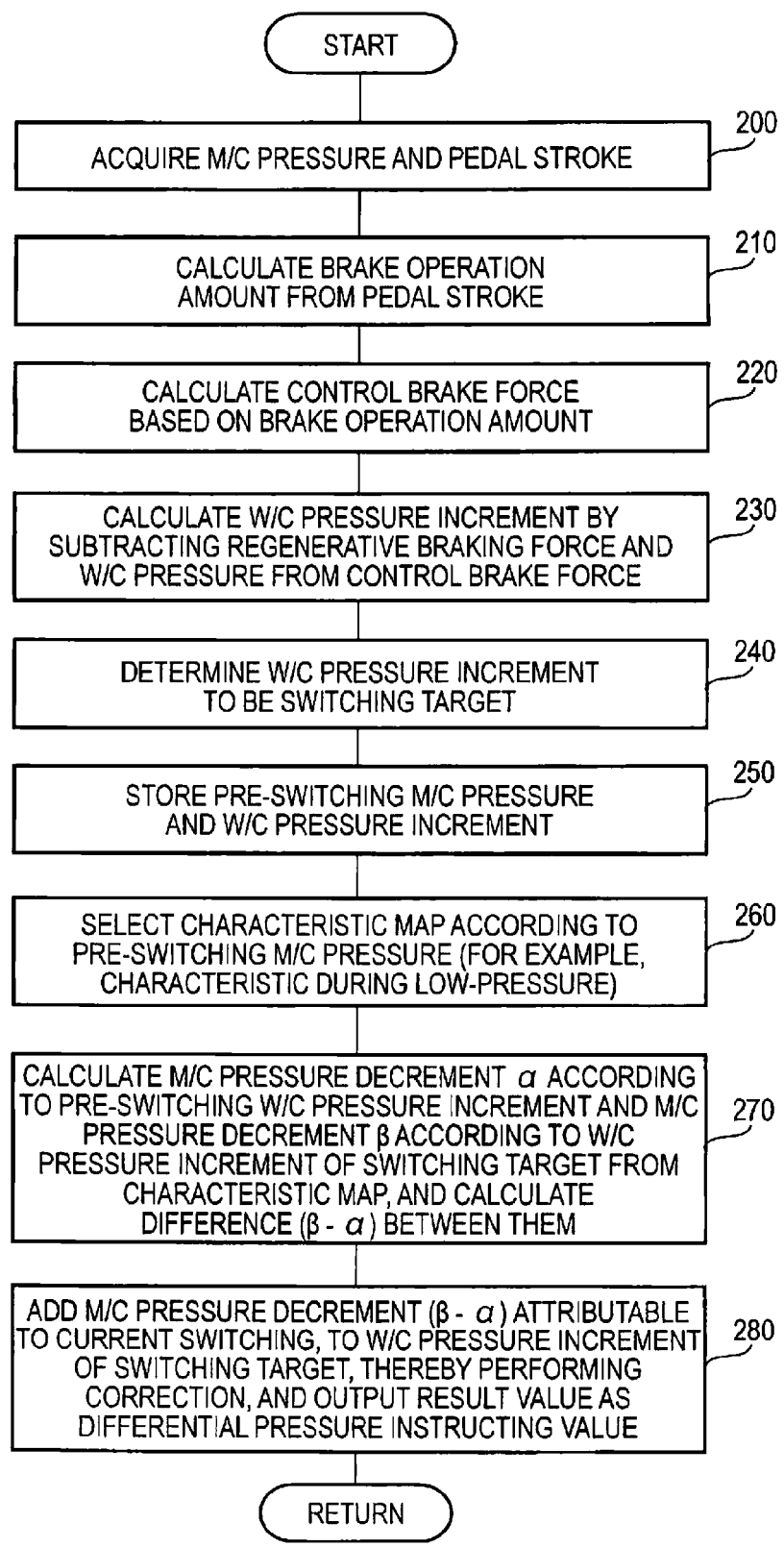
FIG. 8 is a flow chart illustrating another brake control process which the brake ECU performs.
Figure 9:
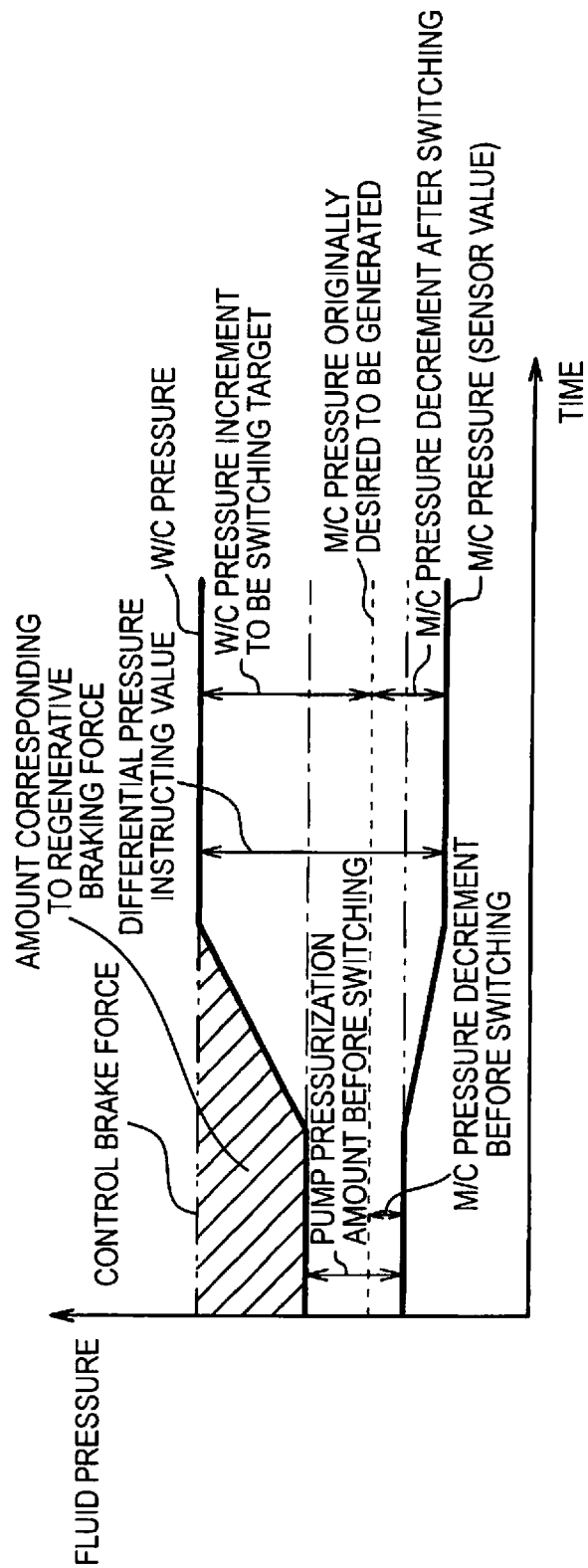
FIG. 9 is a timing chart illustrating changes in the M/C pressure and the W/C pressure before and after switching.

Specifically, the brake control device 1 for a vehicle according to the present illustrative embodiment performs the following operation. FIG. 8 is a flow chart illustrating a brake control process which is performed by the brake ECU 70 of the brake control device 1 for a vehicle according to the present embodiment. Also, FIG. 9 is a timing chart illustrating changes in the M/C pressure and the W/C pressure before and after switching. With reference to FIGS. 8 and 9, the operation of the brake control device 1 for a vehicle according to the present illustrative embodiment will be described. Each process shown in FIG. 8 also is performed for each predetermined control period, for example, when an ignition switch is on.

As shown in FIG. 8, in step 200 to step 230, the same processes as those of step 100 to step 130 of the first illustrative embodiment shown in FIG. 4 are performed. Next, the process proceeds to step 240 in which it determines a W/C pressure increment to be a switching target. In a case of performing switching from the regenerative braking force to the hydraulic braking force, the regenerative braking force having been generated is switched to the hydraulic braking force attributable to pump pressurization. Therefore, as shown in FIG. 9, a value obtained by subtracting an M/C pressure which the driver originally desired to generate, from the control brake force becomes the W/C pressure increment to be the switching target. Therefore, the M/C pressure which the driver originally desired to generate at a switching start time is subtracted from the control brake force at that time, so that the W/C pressure increment to be the switching target is obtained. Also, the switching start time is grasped by receiving data for regenerative braking control from the hybrid ECU 81. Further, since the W/C pressure increment before switching is relatively small, an amount corresponding to the regenerative braking force is directly set as the W/C pressure increment to be the switching target.

Next, the process proceeds to step 250 in which it stores the pre-switching M/C pressure and the pre-switching W/C pressure increment. For example, the M/C pressure and the W/C pressure increment are continuously updated until the switching starts, and if start of the switching is detected based on the data received from the hybrid ECU 81, the M/C pressure and the W/C pressure increment immediately before the switching are held.

Subsequently, the process proceeds to step 260 in which it selects a characteristic map according to the pre-switching M/C pressure. With respect to the pre-switching M/C pressure, the data stored in step 240 is used. One characteristic map can be selected, for example, from the characteristic map during high pressure and the characteristic map during low pressure as shown in FIG. 7. If the pre-switching M/C pressure is less than the predetermined threshold pressure, the characteristic map during low pressure is selected, and if the pre-switching M/C pressure is equal to or greater than the threshold pressure, the characteristic map during high pressure is selected.

Then, the process proceeds to step 270 in which it obtains an M/C pressure decrement α according to the pre-switching W/C pressure increment, and an M/C pressure decrement β according to the target W/C pressure increment attributable to the switching, from the characteristic map, and calculates the difference ((β−α) between them (see FIG. 7). As described above, in a case of performing switching from the regenerative braking force to the hydraulic braking force, since the pre-switching W/C pressure increment is small, the M/C pressure decrement at that time is small. For this reason, the M/C pressure decrements α and β corresponding to the W/C pressure increments before and after the switching, respectively, are obtained, and the difference ((β−α) between them, that is, an M/C pressure decrement attributable to the switching (a change in the M/C pressure decrement before and after the switching) is calculated.

Next, the process proceeds to step 280 in which it adds the M/C pressure decrement ((β−α) attributable to the switching, to the W/C pressure increment of the switching target, and outputs the result value as the differential pressure instructing value. In other words, the W/C pressure increment of the switching target calculated in step 240 is not directly used as the differential pressure instructing value, but the differential pressure instructing value is obtained by correction using the M/C pressure decrement attributable to the switching as a correction amount. Therefore, even if pump pressurization increases due to switching during brake operation of the driver, it is possible to generate a W/C pressure corresponding to the sum of the M/C pressure which the driver originally desired to generate corresponding to the intended brake operation of the driver, and the W/C pressure increment.

As described above, in the brake control device 1 for a vehicle according to the present embodiment, a map according to the generated M/C pressure is selected from the plurality of maps, and the M/C pressure decrement is calculated from the selected map. Therefore, it is possible to reduce an error between the calculated M/C pressure decrement and an actual M/C pressure decrement as compared to a case of using one standard map to calculate the M/C pressure decrement.

Also, the M/C pressure decrement ((β−α) before and after the switching is calculated from the W/C pressure increments before and after the switching, and is added as the correction amount to the W/C pressure increment of the switching target, so that the differential pressure instructing value to the first and second differential pressure control valves 16 and 36 is obtained. Therefore, even if pump pressurization increases due to switching during brake operation of the driver, it is possible to generate a W/C pressure corresponding to the sum of the M/C pressure which the driver originally desired to generate corresponding to the intended brake operation of the driver, and the W/C pressure increment.

Third Illustrative Embodiment

A third illustrative embodiment of this disclosure will be described. The present illustrative embodiment is the same as the second illustrative embodiment except for the method of setting the correction amount of the differential pressure instructing value, and thus only differences from the second illustrative embodiment will be described.

As described in the above-mentioned second embodiment, only during switching in the regenerative cooperative control, it is possible to perform correction of the W/C pressure increment. However, since switching is basically performed immediately before the vehicle stops, it is easy for control on pump pressurization and brake operation of the driver for adjusting the stop position, mitigating a shock, or the like to overlap. In a case where the driver performs brake operation during control on pump pressurization, the operation is performed while the brake pedal 11 is operating due to suction of the brake fluid in the M/C 13 by the pump pressurization. For this reason, the intended brake operation amount of the driver becomes a value different from a change in the M/C pressure. Therefore, in order for more pressurization according to the intention of the driver, an estimation M/C pressure is calculated from the W/C pressure increment and the M/C pressure detected by the M/C pressure sensor 51, and the M/C pressure decrement is calculated based on the estimation M/C pressure and the W/C pressure increment, so that the correction amount is obtained.

Figure 10:
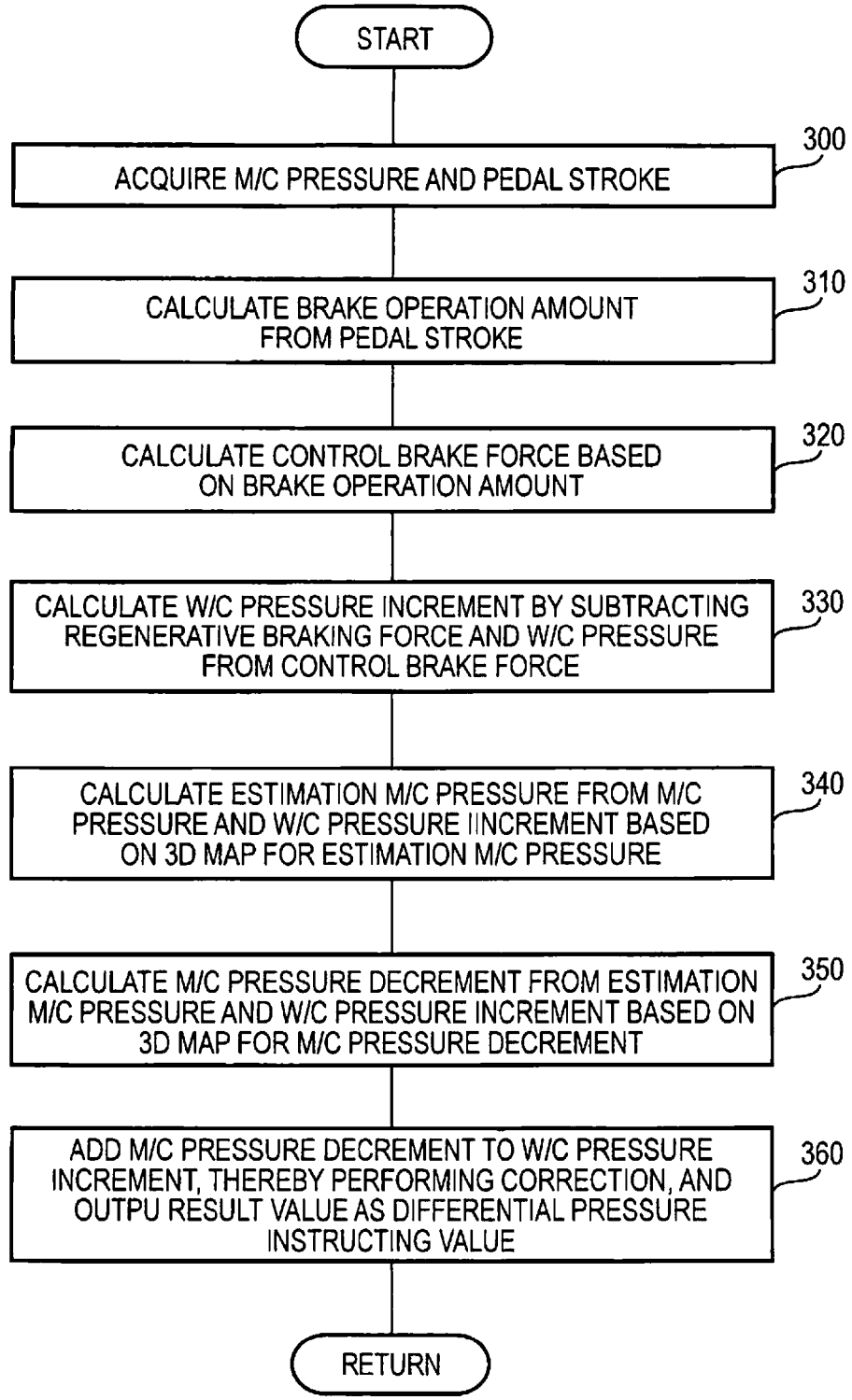
FIG. 10 is a flow chart illustrating another brake control process which the brake ECU performs.
Figure 11A:
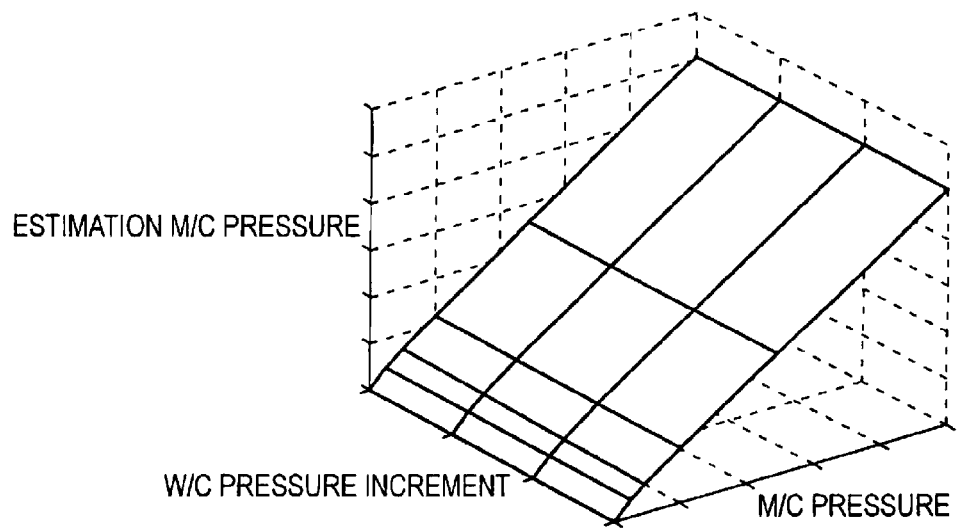
FIG. 11A is a three-dimensional (3D) map for setting an estimation M/C pressure.
Figure 11B:
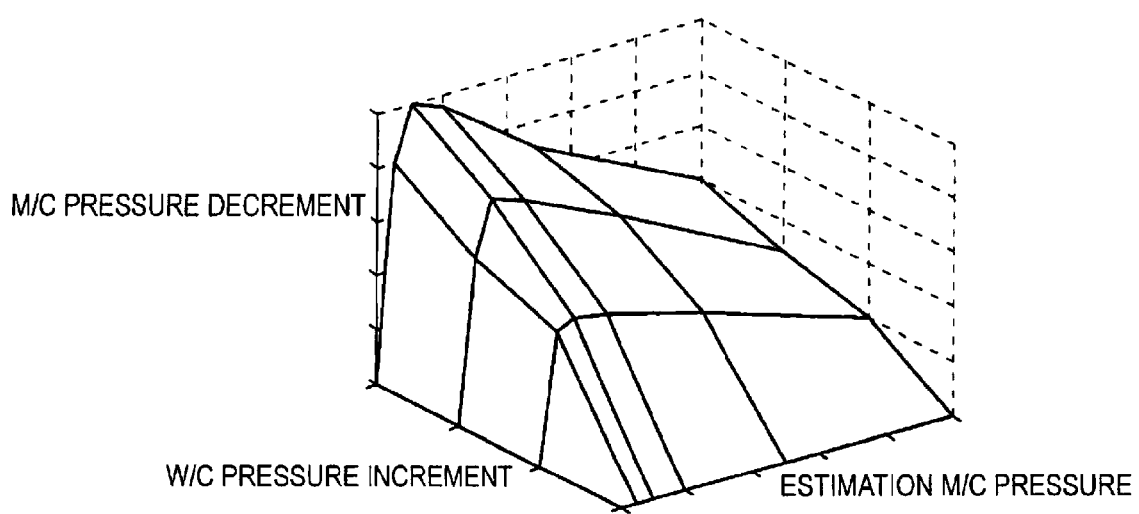
FIG. 11B is a 3D map for calculating a decreased amount of the M/C pressure.

Specifically, the brake control device 1 for a vehicle according to the present illustrative embodiment performs the following operation. FIG. 10 is a flow chart illustrating a brake control process which is performed by the brake ECU 70 of the brake control device 1 for a vehicle according to the present embodiment. Also, FIG. 11A is a three-dimensional (3D) map for setting an estimation M/C pressure, and FIG. 11B is a 3D map for calculating an M/C pressure decrement.

As shown in FIG. 10, in step 300 to step 330, the same processes as those of step 200 to step 230 of the second illustrative embodiment shown in FIG. 8 are performed. Next, the process proceeds to step 340 in which it calculates the estimation M/C pressure based on the W/C pressure increment and an actual M/C pressure detected from a detection signal of the M/C pressure sensor 51. Specifically, the 3D map shown in FIG. 11A is used to select the estimation M/C pressure corresponding to the actual M/C pressure and the W/C pressure increment. This 3D map is obtained in advance based on a W/C fluid consumption or the like by experiments. As the amount of suction of the brake fluid in the M/C 13 increases, the amount of suction of the brake pedal 11 increases. Therefore, a map in which even when the actual M/C pressure is constant, as the W/C pressure increment amount of creases, the estimation M/C pressure increments is obtained.

Figure 12:
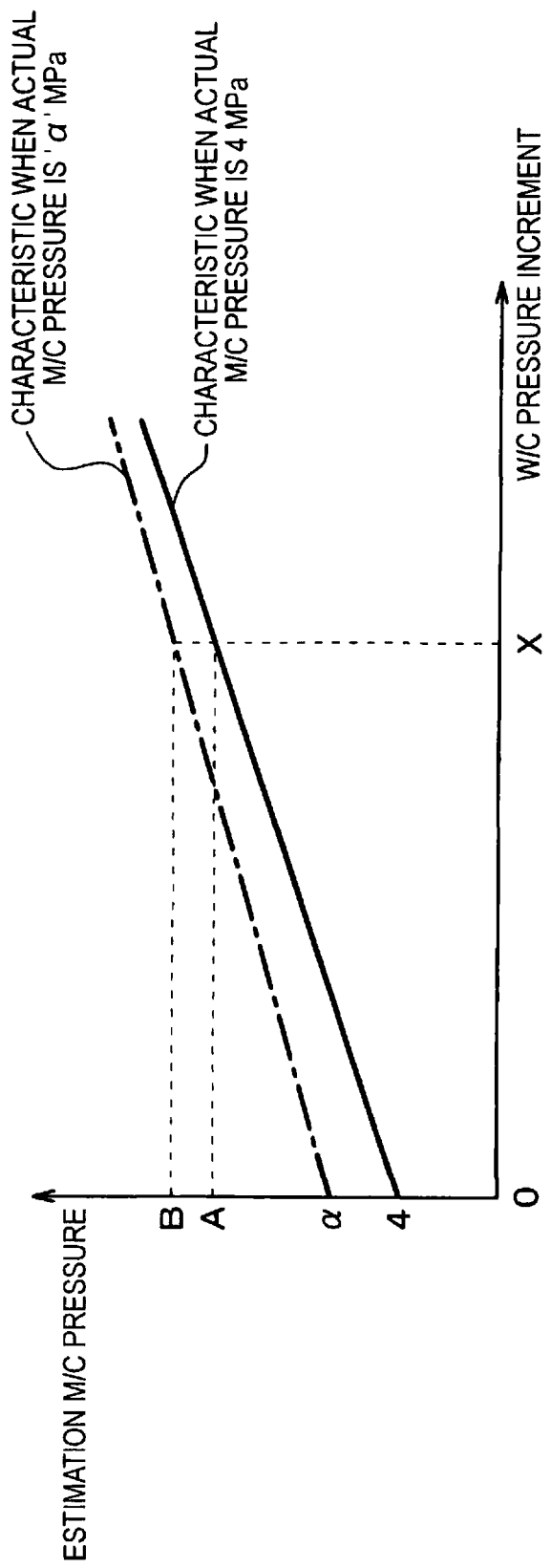
FIG. 12 is a map illustrating the relation between a decreased amount of the W/C pressure and an estimation M/C pressure according to an actual M/C pressure.

If this relation is graphically illustrated, for example, as shown in FIG. 12, in a case where the actual M/C pressure is 4 MPa, and a pump pressurization amount is 0, that is, the W/C pressure increment is 0, the estimation M/C pressure becomes 4 MPa. In contrast, in a case where the actual M/C pressure is 4 MPa, and the pump pressurization amount is 'X', that is, the W/C pressure increment is not 0, the estimation M/C pressure becomes 'A' MPa which is larger than 4 MPa. Also, in a case where the actual M/C pressure is 'α' MPa which is larger than 4 MPa, and the pump pressurization amount is 'X', that is, the W/C pressure increment is not 0, the estimation M/C pressure becomes 'B' MPa which is larger than 'A' MPa.

Next, the process proceeds to step 350 in which it calculates the M/C pressure decrement based on the estimation M/C pressure calculated in step 340 and the W/C pressure increment calculated in step 330. Specifically, the 3D map shown in FIG. 11B is used to select the M/C pressure decrement corresponding to the estimation M/C pressure and the W/C pressure increment. This 3D map is also obtained in advance based on the W/C fluid consumption or the like by experiments. Even in this case, as the amount of suction of the brake fluid in the M/C 13 increases, the amount of suction of the brake pedal 11 increases. Therefore, a map in which even when the estimation M/C pressure is constant, as the W/C pressure increment amount increases, the M/C pressure decrement increases is obtained.

If the M/C pressure decrement is calculated in that way, the process proceeds to step 360 in which it adds the M/C pressure decrement to the W/C pressure increment and outputs the result value as the differential pressure instructing value.

According to the above, in a case where the brake operation amount and a change in the M/C pressure become different values, such as a case where the driver performs brake operation during control on pump pressurization, the estimation M/C pressure is calculated from the W/C pressure increment and the M/C pressure detected by the M/C pressure sensor 51. Then, the M/C pressure decrement is calculated based on the estimation M/C pressure and the W/C pressure increment, and is added as the correction amount to the W/C pressure increment, so that the differential pressure instructing value is obtained. Therefore, even in a case where pump pressurization and brake operation of the driver overlap, it is possible to reflect the brake operation more accurately.

Other Embodiments (1) In each above-mentioned embodiment, the brake control device for a vehicle which performs cooperative control of the hydraulic brake device and the regenerative braking device 80 has been described. However, this disclosure can be applied to a brake control device 1 for a vehicle which performs brake control to perform pump pressurization such brake fluid is sucked from an M/C 13 so that a W/C pressure becomes higher than an M/C pressure. In this brake control device 1 for a vehicle, in a case of performing differential pressure control of controlling a differential pressure of a differential pressure control valve such as the first and second differential pressure control valves 16 and 36 to change the W/C pressure, a differential pressure instructing correction amount which is a correction amount of a differential pressure instructing output is calculated based on a differential pressure change amount, and then a differential pressure instructing output corrected based on the differential pressure instructing correction amount is generated.

For example, when the differential pressure increases, such as when switching from the regenerative braking force to the hydraulic braking force is performed, the differential pressure instructing correction amount is calculated based on the increased amount of the differential pressure, and the differential pressure instructing output is corrected based on the differential pressure instructing correction amount such that the differential pressure instructing output becomes larger than the increased amount of the differential pressure. In contrast, when the differential pressure decreases, such as when the regenerative braking force increases such that the hydraulic braking force decreases, the differential pressure instructing correction amount is calculated based on the decreased amount of the differential pressure, and then the differential pressure instructing output is corrected based on the differential pressure instructing correction amount such that the differential pressure instructing output becomes smaller than the decreased amount of the differential pressure. If this control is performed, even in a case where pump pressurization and brake operation of the driver overlap, it is possible to reflect the brake operation more accurately.

Further, when the differential pressure instructing correction amount is calculated based on the increase or decreased amount of the differential pressure, it is preferable that, as the increased amount or decreased amount of the differential pressure is larger, the differential pressure instructing correction amount increases. For example, as described in the second embodiment, since the M/C pressure decrements $\alpha$ and $\beta$ corresponding to the W/C pressure increments before and after switching are obtained, and the difference $(\beta-\alpha)$ between them is used as the differential pressure instructing correction amount, it is possible to increase the differential pressure instructing correction amount as the increased amount of the differential pressure increases. Therefore, it is possible to perform appropriate correction according to the magnitude of a change in the differential pressure.

(2) In a case of each above-mentioned embodiment, a case of outputting an instructing current to be the differential pressure instructing value, as the differential pressure instructing output, from the brake ECU 70 has been described. However, other forms can be implemented. For example, it is possible to generate an output (for example, a differential pressure value itself) corresponding to a differential pressure desired to be generated from the brake ECU 70 and supply a current having a current value corresponding to the differential pressure value from another current supplying unit to the solenoids of the first and second differential pressure control valves 16 and 36.

(3) In the above-mentioned second embodiment, when the differential pressure changes, the M/C pressure to be an operation index corresponding to the brake operation amount of the driver is detected, and a map (the character map during high pressure or the character map during low pressure) is selected according to the magnitude of the M/C pressure. Then, the selected map is used to calculate the differential pressure instructing correction amount according to the magnitude of the M/C pressure. Accordingly, since the differential pressure instructing correction amount is calculated based on the operation index, it is possible to feed back the brake operation amount of the driver as the differential pressure instructing correction amount based on the operation index. For the calculation of the differential pressure instructing correction amount based on the operation index, not only a plurality of maps set according to the magnitude of the operation index but also relational expressions may be used.

Also, in the third embodiment, the estimation M/C pressure is calculated based on the M/C pressure to be an operation index, and the differential pressure instructing correction amount is calculated based on the estimation M/C pressure. Accordingly, it is possible to simply feed back the operation index. However, it is also possible to calculate the estimation M/C pressure corresponding to an estimation operation amount to be an estimation value of the brake operation amount of the driver based on the operation index, and calculate the differential pressure instructing correction amount based on the estimation operation amount. In this way, it is possible to calculate the differential pressure instructing correction amount according to the intended brake operation amount of the driver.

Also, in each above-mentioned embodiment, as the operation index corresponding to the brake operation amount of the driver, the M/C pressure has been exemplified, and as the estimation operation amount, the estimation M/C pressure has been exemplified. However, the operation index may be a pedal stroke, and the estimation operation amount may be an estimation pedal stroke.

(4) In each above-mentioned embodiment, as a brake operating member, the brake pedal 11 has been exemplified. However, other brake operating members, for example, a brake lever may be used. Also, in the above-mentioned embodiments, the regenerative braking force acts only on the front right wheel FR and the front left wheel FL. However, the regenerative braking force may act on the rear wheels, all wheels, or the like, and the vehicle may have no regenerative braking force. Also, in the above-mentioned embodiments, as the brake piping form, the X-piping is configured such that the front right wheel FR and the rear left wheel RL are included in the same system, and the front left wheel FL and the rear right wheel RR are included in the same system. However, front and rear piping may be configured such that the front right wheel FR and the front left wheel FL are included in the same system, and the rear right wheel RR and the rear left wheel RL are included in the same system.

(5) Steps shown in the drawings correspond to units performing various processes. In other words, a part performing the processes of steps 100 to 150, 200 to 280, and 300 to 360 corresponds to a differential pressure control unit, and a part performing the processes of steps 140, 270, and 350 of them corresponds to a correcting unit.

What is claimed is:

1. A brake control device for a vehicle comprising:
    a hydraulic brake device including:
        a master cylinder which generates a brake fluid pressure according to a brake operation amount of a brake operating member by a driver;
        wheel cylinders which are connected to the master cylinder by main pipe line and which generate a braking force according to the generated fluid pressure;
        a differential pressure control valve which is disposed in the main pipe line and which generates a differential pressure corresponding to a fluid pressure difference between the master cylinder and the wheel cylinders, and
        a pump which sucks the brake fluid from a portion of the main pipe line between the differential pressure control valve and the master cylinder and which discharges the brake fluid to a portion of the main pipe line between the differential pressure control valve and the wheel cylinder for increasing the brake fluid pressures of the wheel cylinders; and
    a differential pressure control unit which operates the pump and which transmits a differential pressure instructing output to the differential pressure control valve to perform a differential pressure control such that a differential pressure corresponding to the differential pressure instructing output is generated;
    wherein the differential pressure control unit is configured to:
    calculate, when the differential pressure generated by the differential pressure control valve is to be increased during operation of the brake operating member by the driver, an amount, which corresponds to an amount by which the fluid pressure of the wheel cylinder is to be increased by the differential pressure control unit, by which the fluid pressure of the master cylinder will decrease relative to the fluid pressure of the master cylinder when the fluid pressure of the wheel cylinder is not increased by the differential pressure control unit;
    correct the differential pressure instructing output by the calculated amount by which the fluid pressure of the master cylinder will decrease; and
    transmit, to the differential pressure control valve, the differential pressure instructing output which has been corrected by the calculated amount by which the fluid pressure of the master cylinder will decrease.

2. The brake control device for a vehicle according to claim 1,
    wherein the differential control unit is configured to:
    calculate, when the differential pressure generated by the differential pressure control valve is to be decreased during operation of the brake operating member by the driver, an amount, which corresponds to an amount by which the fluid pressure of the wheel cylinder is to be decreased by the differential pressure control unit, by which the fluid pressure of the master cylinder will increase relative to the fluid pressure of the master cylinder when the fluid pressure is of the wheel cylinder is not decreased by the differential pressure control unit;

correct the differential pressure instructing output by the calculated amount by which the fluid pressure of the master cylinder will increase; and transmit, to the differential pressure control valve, the differential pressure instructing output which has been corrected by the calculated amount by which the fluid pressure of the master cylinder will increase.

3. The brake control device for a vehicle according to claim 1, wherein the differential pressure control unit calculates the amount by which the fluid pressure of the master cylinder will decrease such that the amount by which the fluid pressure of the master cylinder will decrease increases as the amount by which the fluid pressure of the wheel cylinder is to be increased increases.

4. The brake control device for a vehicle according to claim 1, wherein the differential pressure control unit detects an operation index representing an operating amount of the brake operating member during control of increasing the differential pressure to be generated by the differential pressure control valve and then calculates the amount by which the fluid pressure of the master cylinder will decrease based on the operation index.

5. The brake control device for a vehicle according to claim 1, wherein the differential pressure control unit calculates an estimation operation amount which is an estimation value of an operation index corresponding to the intended operating amount of the driver, based on the operation index, and calculates the amount by which the fluid pressure of the master cylinder will decrease based on the estimation operation amount.

6. The brake control device for a vehicle according to claim 2, wherein the differential pressure control unit calculates the amount by which the fluid pressure of the master cylinder will decrease such that the amount by which the fluid pressure of the master cylinder will decrease increases as the amount by which the fluid pressure of the wheel cylinder is to be increased increases.

7. The brake control device for a vehicle according to claim 2, wherein the differential pressure control unit detects an operation index representing an operating amount of the brake operating member during control of increasing the differential pressure to be generated by the differential pressure control valve and then calculates the amount by which the fluid pressure of the master cylinder will decrease based on the operation index.

8. The brake control device for a vehicle according to claim 3, wherein the differential pressure control unit detects an operation index representing an operating amount of the brake operating member during control of increasing the differential pressure to be generated by the differential pressure control valve and then calculates the amount by which the fluid pressure of the master cylinder will decrease based on the operation index.

* * * * *